(12) United States Patent
Hutson et al.

(10) Patent No.: US 12,212,610 B2
(45) Date of Patent: Jan. 28, 2025

(54) LAST KNOWN STATE ACROSS A PLURALITY OF DISPERSED GEOGRAPHIC SENSORS SYNCHRONIZED TO A COMMON CLOCK

(71) Applicant: UBICQUIA LLC, Fort Lauderdale, FL (US)

(72) Inventors: Bradford Brian Hutson, Fort Lauderdale, FL (US); Ian B. Aaron, Fort Lauderdale, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 1086 days.

(21) Appl. No.: 16/960,516

(22) PCT Filed: Jan. 8, 2019

(86) PCT No.: PCT/US2019/012766
§ 371 (c)(1),
(2) Date: Jul. 7, 2020

(87) PCT Pub. No.: WO2019/136474
PCT Pub. Date: Jul. 11, 2019

(65) Prior Publication Data
US 2020/0370741 A1    Nov. 26, 2020

Related U.S. Application Data

(60) Provisional application No. 62/730,379, filed on Sep. 12, 2018, provisional application No. 62/614,918, filed on Jan. 8, 2018.

(51) Int. Cl.
*H04L 65/40*    (2022.01)
*F21S 8/08*    (2006.01)
(Continued)

(52) U.S. Cl.
CPC ............ *H04L 65/40* (2013.01); *F21V 23/045* (2013.01); *F21V 23/0457* (2013.01);
(Continued)

(58) Field of Classification Search
CPC ........ H04L 65/40; H04W 4/70; H05B 47/175; H05B 47/105; F21V 23/045;
(Continued)

(56) References Cited

U.S. PATENT DOCUMENTS 8,260,575 B2 * 9/2012 Walters ................ G06Q 30/04
700/83
8,588,942 B2 * 11/2013 Agrawal ................ H05B 47/22
700/20
(Continued)

FOREIGN PATENT DOCUMENTS

KR    20060008977 A * 1/2006
KR    101653264 B1 * 9/2016
(Continued)

OTHER PUBLICATIONS

Extended European Search Report for European Application No. 19735746.0, issued Oct. 4, 2021, 15 pages.
(Continued)

*Primary Examiner* — Octavia Hollington
(74) *Attorney, Agent, or Firm* — Daniel C. Crilly

(57) ABSTRACT

A system to coordinate event data from a plurality of smart sensor devices that are coupled to streetlight fixtures to generate a last known state across the plurality of smart sensor devises. The plurality of smart sensor devices receive a distributed clock that is common among the smart sensor devices. A local clock of each smart sensor device is synchronized to the distributed clock. Each smart sensor device monitors and stores event data in an incident buffer. The stored event data is correlated to the distributed clock.
(Continued)

The stored correlated event data is transmitted to a remote server. The remote server aggregates the correlated event data from the plurality of smart sensor devices based on the distributed clock to generate a last known state across the plurality of smart sensor devices.

20 Claims, 6 Drawing Sheets

(51) Int. Cl.
    *F21V 23/04*     (2006.01)
    *G01D 21/02*     (2006.01)
    *G01S 19/01*     (2010.01)
    *G06F 1/10*     (2006.01)
    *G16Y 40/10*     (2020.01)
    *H04W 4/70*     (2018.01)
    *H05B 47/105*     (2020.01)
    *H05B 47/175*     (2020.01)

(52) U.S. Cl.
    CPC ............. *G01D 21/02* (2013.01); *G01S 19/01* (2013.01); *G06F 1/10* (2013.01); *H04W 4/70* (2018.02); *H05B 47/105* (2020.01); *H05B 47/175* (2020.01); *F21S 8/086* (2013.01); *G16Y 40/10* (2020.01)

(58) Field of Classification Search
    CPC ..... F21V 23/0457; G01D 21/02; G01S 19/01; G06F 1/10; G16Y 40/10; F21S 8/086
    See application file for complete search history.

(56) References Cited

U.S. PATENT DOCUMENTS

| | | | | |
|---|---|---|---|---|
| 9,621,265 | B2* | 4/2017 | Hartman | H04Q 9/00 |
| 9,622,323 | B2* | 4/2017 | Hartman | G08G 1/087 |
| 9,713,214 | B2* | 7/2017 | Laherty | H05B 45/00 |
| 10,873,170 | B2* | 12/2020 | Zimmerman, III | H05B 47/19 |
| 11,116,062 | B1* | 9/2021 | Leizerovich | H05B 47/11 |
| 11,191,145 | B2* | 11/2021 | Zimmerman, III | H05B 47/11 |
| 11,445,593 | B2* | 9/2022 | Hutson | F21S 8/085 |
| 11,665,804 | B2* | 5/2023 | Aaron | H05B 47/11 |
| | | | | 455/561 |
| 11,670,875 | B2* | 6/2023 | Root | H01Q 1/526 |
| | | | | 343/702 |
| 2009/0002982 | A1* | 1/2009 | Hu | F21V 23/0457 |
| | | | | 362/276 |
| 2009/0222241 | A1 | 9/2009 | Dorogi et al. | |
| 2009/0231191 | A1* | 9/2009 | Wu | H04J 3/0635 |
| | | | | 342/357.395 |
| 2012/0038490 | A1* | 2/2012 | Verfuerth | G08G 1/04 |
| | | | | 340/917 |
| 2014/0293993 | A1 | 10/2014 | Ryhorchuk | |
| 2015/0362172 | A1* | 12/2015 | Gabriel | F21V 11/16 |
| | | | | 348/151 |
| 2016/0165703 | A1 | 6/2016 | Laherty et al. | |
| 2016/0286627 | A1 | 9/2016 | Chen et al. | |
| 2016/0286629 | A1* | 9/2016 | Chen | H05B 47/19 |
| 2018/0045388 | A1* | 2/2018 | McDowell | F21V 29/15 |
| 2020/0370741 | A1* | 11/2020 | Hutson | H05B 47/105 |

FOREIGN PATENT DOCUMENTS

| | | | |
|---|---|---|---|
| KR | 10-2016-0124504 A | | 10/2016 |
| KR | 20170019575 A | * | 2/2017 |
| WO | 2012/140152 A1 | | 10/2012 |
| WO | WO-2017134091 A1 | * | 8/2017 |
| WO | 2017/184636 A1 | | 10/2017 |
| WO | WO-2017214162 A1 | * | 12/2017 ............... H04B 1/40 |

OTHER PUBLICATIONS

International Preliminary Report on Patentability for PCT Application No. PCT/US2019/012766, issued Jul. 23, 2020, 9 pages.

PCT/US2019/012766—International Search Report and Written Opinion, mailed May 1, 2019, 12 pages.

* cited by examiner

LAST KNOWN STATE ACROSS A PLURALITY OF DISPERSED GEOGRAPHIC SENSORS SYNCHRONIZED TO A COMMON CLOCK

BACKGROUND

Technical Field

The present disclosure generally relates to aerial lighting fixture monitoring. More particularly, but not exclusively, the present disclosure relates to a computing devices that are mounted to aerial lighting fixtures that collectively maintain a last known state.

Description of the Related Art

Aerial lighting fixtures are known to include conventional light controllers. These conventional light controllers may be electric devices, mechanical devices, or electromechanical devices. Generally, if the controller detects an amount of light that is determined to be insufficient, the controller will direct the light source in the aerial lighting fixture to illuminate. On the other hand, if the controller detects an amount of light that is determined to be sufficient, the controller will direct the light source in the aerial lighting fixture to extinguish.

In some instances, the controller may be more sophisticated and perform additional functionality beyond simply directing the light source to turn on or off. For example, the controller may track time of day when it instructed the light source to turn on or off, store an amount of time the light source was illuminated, or provide additional functionality. If, however, an incident occurs that impacts multiple aerial lighting fixtures, then it may be difficult to recreate the state of each light source prior to the incident. For example, if a hurricane topples numerous aerial lighting fixtures in an area, it may be difficult to determine which lights were on and which lights were off, or if there are any other damage or issues with the aerial lighting fixtures.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

A system may be summarized as including a plurality of smart sensor devices coupled to respective streetlight fixtures of a plurality of streetlight fixtures, wherein each smart sensor device includes: a transceiver arranged to receive a distributed clock and transmit stored correlated event data; a local clock circuit arranged to supply a local clock signal to circuitry of the smart sensor device, wherein the local clock signal is synchronized to the distributed clock; a local memory arranged to store event data; and a processor-based event-monitoring circuit arranged to receive event data captured by a sensor, correlate the event data with the distributed clock based on the synchronized local clock signal, and store the correlated event data in the local memory; and a remote server that includes: a memory arranged to store the correlated event data received from the plurality of smart sensor devices; and a processor arranged to execute computer instructions that when executed by the processor cause the processor to: aggregate the correlated event data from the plurality of smart sensor devices based on the distributed clock; and generate a last known state across the plurality of smart sensor devices from the aggregated event data and synchronized to the distributed clock.

The processor-based event-monitoring circuit of each of the plurality of smart sensor devices may be further arranged to transmit the correlated event data to the remote server in response to an external incident.

The processor of the remote server may be arranged to execute the computer instructions that, when executed by the processor, may further cause the processor further to send a request to each of the plurality of smart sensor devices requesting each of the plurality of smart sensor devices to transmit the correlated event data currently stored in their local memory to the remote server. The request may be sent to each of the plurality of smart sensors in response to an incident.

The processor of the remote server may be arranged to execute the computer instructions that, when executed by the processor, may further cause the processor further to send to each respective smart sensor device of the plurality of smart sensor devices a selection of events to be monitored by the respective smart sensor device.

The processor-based event-monitoring circuit may be further arranged to receive a selection of events to monitor for the event data. The local memory of each of the plurality of smart sensor devices may be a non-transitory memory that temporary stores the correlated event data in a first-in-first-out configuration. Each of the plurality of smart sensor devices may include at least one interface that is coupled to at least one sensor that is selected from the group consisting of a tilt sensor, an accelerometer, a temperature sensor, a power metering sensor, a camera, a microphone, a humidity sensor, a rain collection sensor, and a wind sensor.

A smart sensor device coupled to a streetlight fixture may be summarized as including a GPS receiver arranged to receive GPS signals that include a distributed clock; a local clock circuit arranged to supply a local clock signal to circuitry of the smart sensor device, wherein the local clock signal is synchronized to the distributed clock; a local, non-volatile memory arranged to store a limited amount of data; a sensor arranged to capture event data; a processor-based event-monitoring circuit arranged to receive the captured event data from the sensor, correlate the event data with the distributed clock based on the synchronized local clock signal, and store the correlated event data in the memory; and a transceiver arranged to transmit the stored correlated event data to a remote server. The local, non-volatile memory may store the correlated event data in a first-in-first-out configuration.

The smart sensor device may further include a receiver that receives, from the remote server, a selection of events to monitor via the sensor for the event data.

The local clock circuit may be further arranged to resynchronize the local clock signal to the distributed clock in response to a difference between the local clock signal and a new distributed clock that is included in a GPS signal. The transceiver may be arranged to transmit the stored correlated event data to the remote server in response to an external incident.

The smart sensor device may further include a connector compliant with a roadway area lighting standard promoted by a standards body for coupling the smart sensor device to a streetlight fixture. The sensor may be selected from the group consisting of a tilt sensor, an accelerometer, a temperature sensor, a power metering sensor, a camera, a microphone, a humidity sensor, a rain collection sensor, and a wind sensor.

A method may be summarized as including receiving a selection of events to monitor for each of a plurality of smart sensor devices coupled to respective streetlight fixtures of a plurality of streetlight fixtures; providing the selection of events to the plurality of smart sensor devices; identifying an occurrence of an incident associated with the plurality of streetlight fixtures; receiving, from each of the plurality of smart sensor devices, event data that is correlated to a clock that is distributed to each of the plurality of smart sensor devices; aggregating the correlated event data based on the distributed clock; and generating a last known state of the plurality of smart sensor devices prior to the occurrence of the incident.

The method may further include sending a request for the correlated event data in response to the occurrence of the incident; and receiving, from each of the plurality of smart sensor devices, the correlated event data in response to the request.

The method may further include providing the last known state of the plurality of smart sensors to a user.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Embodiments of the present disclosure include smart sensor devices that have a desired shape and electromechanical configuration for mounting to a roadside aerial lighting fixture (e.g., "streetlight fixture," also referred to as an "aerial light fixture"). More particularly, each smart sensor device includes an interface connector that is compliant with a particular standard used by streetlight fixtures, such as a NEMA-style connector. The NEMA-style connector enables the smart sensor device to be electromechanically coupled to the streetlight fixture, generally on the top of the streetlight fixture. In this way, the smart sensor device is attached to or otherwise integrated into the streetlight fixture and can pass information between the smart sensor device and the streetlight fixture. The information may include any one or more of high speed data, low speed data, power, digital signals, analog signals, differential signals, or other types of information. In various embodiments, smart sensor devices may include or be referred to as aerial control fixtures, small cell networking devices, streetlight-fixture controller, aerial smart sensor devices, or the like.

The present disclosure may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

Figure 1:
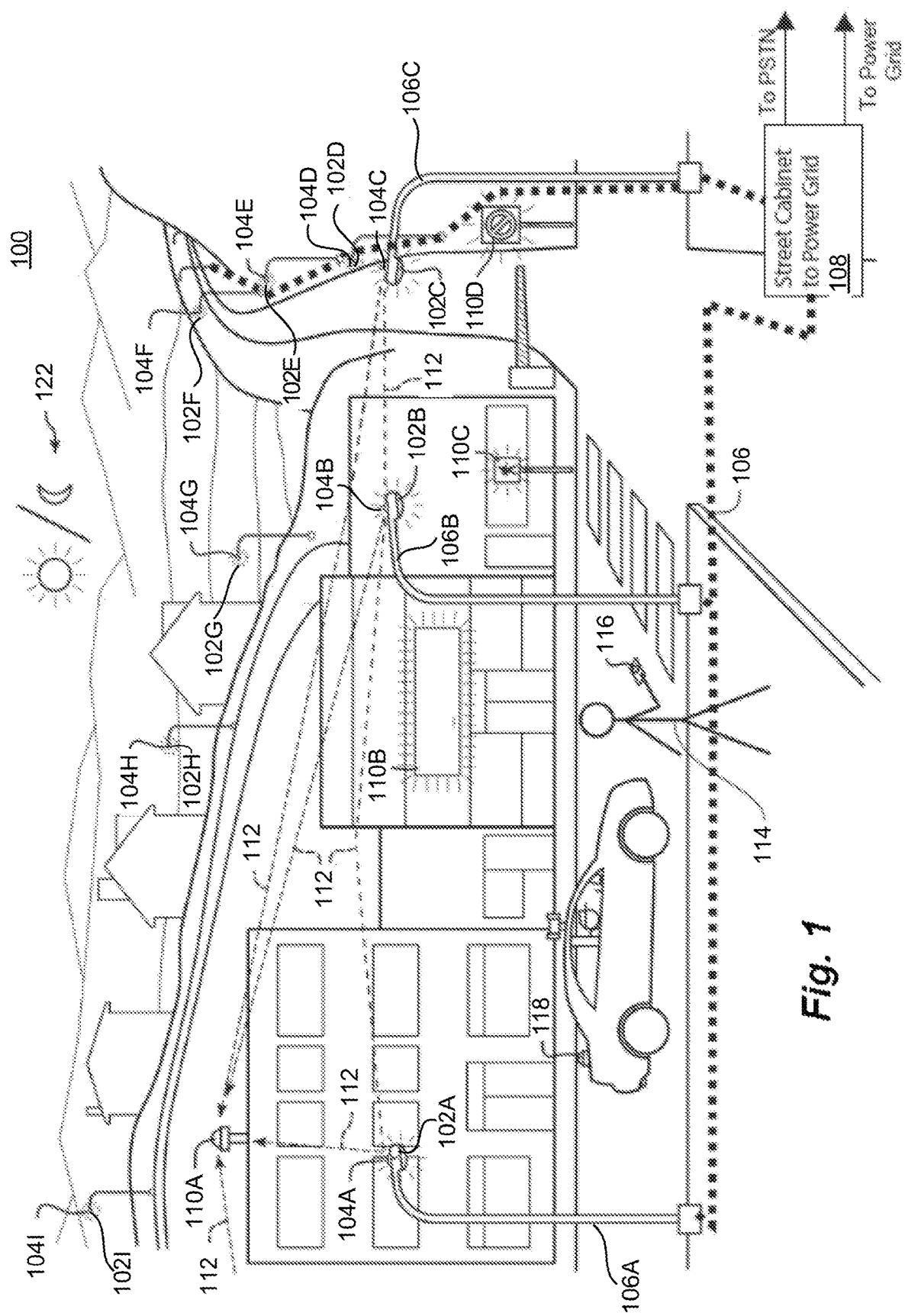
FIG. 1 is a system level deployment of smart sensor devices coupled to streetlight fixtures.

FIG. 1 is a system level deployment 100 of smart sensor devices 104A-104I coupled to streetlight fixtures 102A-102I. The streetlight fixtures 102A-102I are coupled to or otherwise arranged as part of a system of streetlight poles, and each streetlight fixture includes a light source. Each light source, light fixture, and light fitting, individually or along with their related components, may in some cases be interchangeably referred to as a luminaire, a light source, a streetlight, a streetlamp, or some other such suitable term. Those of ordinary skill in the art will understand that a smart sensor device 104 as described herein does not need to be directly coupled to a streetlight fixture 102 and instead such smart sensor device 104 can be coupled to buildings, towers, masts, signage, or any other structure. Nevertheless, for simplicity in the description, smart sensor devices 104A-104I described herein are coupled to streetlight fixtures 102A-102I.

Briefly, each smart sensor device 104 monitors one or more sensors or conditions associated with the corresponding streetlight fixture 102 for events. An event occurrence can be based on a general instruction to monitor a sensor, such as record the tilt of the light pole every one second. Or an event occurrence can be triggered based on a specific sensor value or multiple sensor values, such as record the light pole tilt in response to a threshold vibration value being captured by an accelerometer of the smart sensor device. Examples of events can include, but are not limited to, light source failure (e.g., a burned out bulb), light pole tilt, external vibrations, light source temperature, external temperature, power usage, images, sound recordings, network traffic, network throughput, cellular signal strength, or other information that can be obtained or recorded by the smart sensor device 104.

In general, each smart sensor device 104A-104I receives a same distributed clock, such as via a GPS signal. Each smart sensor device 104 sets or otherwise calibrates its local clock from the distributed clock. In this way, each local clock of the smart sensor devices 104A-104I is synchronized to the distributed clock. The smart sensor device 104A-104I perform real-time monitoring of one or more sensors or conditions of the smart sensor device 104 for event data. When event data is monitored and captured by a smart sensor device 104, the smart sensor device 104 stores the monitored event data in a local, non-volatile ring buffer that can be accessed by the respective smart sensor device. The stored event data is correlated to the distributed clock that is common to each of the smart sensor devices 104A-104I.

The smart sensor devices 104A-104I may periodically or at selected times send the stored correlated event data to a remote server (not illustrated). In various embodiments, however, smart sensor devices 104A-104I provide the stored event data to the remote server in response to a request from the remote server or in response to a selected incident (e.g., sensor data exceeds a selected threshold value).

The remote server 310 aggregates the correlated event data from a plurality of smart sensor devices 104A-104I to generate a last known state of the plurality of smart sensor devices 104A-104I prior to an incident. In some embodiments, the last known state may also be a current system state, such as if no incident has occurred. The last known state enables the system to take action or present the state of the system to a user. In other embodiments, the last known state may be a current state of the plurality of smart sensor devices 104A-104I at a time of an incident.

In some embodiments, the incident may result in complete failure of each of the plurality of smart sensor devices 104A-104I. In other embodiments, the incident may result in failure of a subset, but not all, of the plurality of smart sensor devices 104A-104I. In yet other embodiments, the incident may occur without failure to any of the plurality of smart sensor devices 104A-104I.

For example, the last known state of the system may indicate which streetlight fixtures are illuminated and the current light intensity of the illuminated streetlight fixtures (e.g., if a subset of streetlight fixtures have an increased light intensity to accommodate for non-illuminated streetlight fixtures or if a subset of streetlight fixtures have a decreased light intensity to extend the life expectancy of the light source). If an external incident occurs, such as the plurality of smart sensor devices 104A-104I lose power because of a grid-wide power outage, then the system can instruct each smart sensor device to set its illumination settings based on the last known state of the overall system. Likewise, if no incident occurs, a user or administrator can be provided the last known state to see where light sources may be failing, and thus send maintenance technicians to fix the failing light sources.

As another example, if a hurricane (i.e., a natural incident) passes through a geographic area that includes the plurality of smart sensor devices 104A-104I, then the last known state of the plurality of smart sensor devices 104A-104I prior to the hurricane impact can be determined. In this way, information about the hurricane or resulting damage from the hurricane can be assessed. For example, the last known state information may identify which light poles may be broken or fatigued because of the wind associated with the hurricane—such information may be obtained from accelerometers, gyroscopes, or other sensors on the smart sensor devices 104A-104I. The ability to assess the last known state across a plurality of geographically dispersed smart sensor devices that are synchronized to a common clock can provide valuable information as to how the incident occurred, how it can be reduced or minimized in the future, or what actions need to take place to recover from the incident.

In yet another example, gunshot detection and triangulation can be performed from the data obtained by the smart sensor devices 104A-104I. For example, each smart sensor device 104A-104I can include a temperature and humidity sensor and a sound detection sensor (e.g., a microphone). In the event that a gunshot is detected with the sound detection sensor, the precise time the smart sensor device captured the gunshot, as well as the current temperature and humidity, can be determined. Because the local clocks of each smart sensor device are synchronized to a common clock, the time, temperature, and humidity information, along with the location of the smart sensor device, can be utilized from a plurality of smart sensor devices to triangulate the originating position of the gunshot.

As shown in the system level deployment 100, a plurality of light poles 106 are arranged in one or more determined geographic areas, such as a city or town, neighborhood, street, county, municipality, city block, etc. Each light pole 106 has at least one streetlight fixture 102 affixed thereto. For example, streetlight fixture 102A is coupled to light pole 106A, streetlight fixture 102B is coupled to light pole 106B, streetlight fixture 102C is coupled to light pole 106C, and so on. In most cases, the streetlight fixture 102 is at least twenty feet above ground level and in at least some cases, the streetlight fixtures 102A-102I are between about 20 feet and 40 feet above ground level. In other cases, the streetlight fixtures 102 may of course be lower than 20 feet above the ground or higher than 40 feet above the ground. Although described as being above the ground, streetlight fixtures 102A-102I may also be subterranean, but positioned above the floor, such as in a tunnel.

The system of streetlight poles, streetlight fixtures, streetlight sources, or the like in the system level deployment may be controlled by a municipality or other government agency. In other cases, the system streetlight poles, streetlight fixtures, streetlight sources, or the like in the system level deployment is controlled by a private entity (e.g., private property owner, third-party service contractor, or the like). In still other cases, a plurality of entities may share control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 200 of FIG. 1, any number of streetlight fixtures 102 may be arranged with a smart sensor device 104. In various embodiments, each smart sensor device 104 includes at least one connector portion that is compliant with a roadway area lighting standard promoted by a standards body, such as a multi-pin NEMA connector that is compliant with an ANSI C136.41, which allows for uniform connectivity to the streetlight fixture 102.

The controlling or servicing authority of the system can install the smart sensor devices 104A-104I on each streetlight fixture 102A-102I, or the smart sensor device 104 may be built into or embedded in each streetlight fixture 102. The use of smart sensor devices 104A-104I allows for the controlling or servicing authority to control the streetlight fixtures 102A-102I, collect information on the streetlight fixtures 102A-102I, or provide other wireless services to the public.

In the system level deployment 200, a smart sensor device 104 is electromechanically coupled to a selected light pole wherein the electromechanical coupling is performed via the connector that is compliant with the roadway area lighting standard promoted by a standards body. In the illustrated example, smart sensor devices 104A-104I are coupled to streetlight fixtures 102A-102I, respectively. In this way, each separate smart sensor device 104A-104I controls or monitors a respective streetlight fixture 102A-102I In some embodiments, the smart sensor device 104 includes a processor-based light control circuit and a light sensor such that it provides a light control signal to the light source of the respective streetlight fixture 102 based on at least one ambient light signal generated by its associated the light sensor.

In other embodiments, each smart sensor device 104A-104I may be equipped with communication capabilities, which allows for the remote control of light source of the streetlight fixture 102A-102I. Accordingly, each light source in each streetlight fixture 102A-102I can be controlled remotely as an independent light source or in combination with other light sources, which also for the wireless communication of light control signals and any other information (e.g., packetized data) between smart sensor devices 104A-104I.

This communication capability may also be used for additional communications between smart sensor devices 104A-104I, other computing devices 110A-110D, or a remote server (not illustrated). Accordingly, each of the plurality of streetlight fixtures 102A-102I that has a corresponding smart sensor device 104 may be communicatively coupled to one another and to other computing devices. Each smart sensor device 104 may be in direct or indirect wireless communication with one another, such as via wireless communication links 112.

In some embodiments, the smart sensor devices 104A-104I may communicate with a remote server (not illustrated), which is discussed in more detail below in conjunction with FIG. 3. In other embodiments, one or more of the smart sensor devices 104A-104I may communicate with other computing devices 110A-110D. The other computing devices 110A-110D may be controlled by a mobile network operator (MNO), a municipality, another government agency, a third party, or some other entity. In at least one embodiment, one or more of the other computing devices 110A-110D be internet of things (IoT) devices or some other types of devices. For example, in this illustration, two public information signs 110B, 110C, and a private entity sign 110D are shown, but many other types of devices are contemplated. Each one of these devices may form an unlicensed wireless communication session (e.g., WiFi) or a cellular-based wireless communication session with one or more wireless networks made available by the smart sensor devices 104A-104I in the system level deployment 100 of FIG. 1.

As one non-limiting, non-exhaustive example, each smart sensor device 104 may operate a small cell networking device to provide wireless cellular-based network communication services. It is generally known that a "small cell" is a term of art in the cellular-based industry. A mobile device, e.g., mobile device 116, provisioned by the MNO communicates with a small cell in the same or similar manner that the mobile device communicates with a macrocell tower. In at least some cases, an active communication session formed between a small cell and a mobile device may be handed off to or from a small cell as the mobile device moves into or out from the active range of the small cell. For example, a user having an active communication session enabled by a small cell may be in motion, and when the mobile device is in motion, the active communication session may in some cases be automatically and seamlessly handed off and continue via another small cell or via a macrocell tower.

As is known, many different types of small cells are deployed by MNOs to serve particular geographic areas within a larger macrocell. Some of the different types are microcells, metrocells, picocells, and femtocells. Microcells generally cover an area having diameter less than about one mile and operate with a radiated power of about five watts (5 W) to ten watts (10 W). Metrocells generally cover an area having a diameter of less than about a half mile and operate with a radiated power of about 5 W or less. Metrocells can provide wireless cellular-based service for up to about 200 concurrent mobile devices. Picocells generally cover an area having a diameter less than about 500 feet and operate with a radiated power of about 100 milliwatts (mW) to 5 W; providing cellular-based wireless service for up to about 5 dozen concurrent mobile devices. Femtocells generally cover areas having a diameter less than about 30 feet and operate with a radiated power of about 10 mW to 1000 mW to provide cellular-based service for up to just a few mobile devices.

Small cells are usually owned and installed and maintained by the MNO on whose network they will operate on. Even in cases of femtocells, which may be installed by non-MNO entity, the femtocells are deployed and provisioned by the MNO for operation on the MNO's wireless cellular-based network. This provisioning is necessary in a small cell because the small cell operates in the MNO's licensed frequency spectrum. In addition to having front end with a cellular-based interface, the small cell has a back end that provides backhaul services for the device. Small cell backhaul is the transmission link between the small cell and the MNO's core network. In some small cells, backhaul services are provided across conventional broadband internet services such as digital subscriber line (DSL), cable, a T1 line, or some other wide area network access point.

In the system level deployment 100 of FIG. 1, various ones of the light poles 106 may be 50 feet apart, 100 feet apart, 250 feet apart, or some other distance. In some cases, the type and performance characteristics of each smart sensor device 104 are selected based on their respective distance to other such devices such that wireless communications are acceptable.

Smart sensor devices 104A-104I may be coupled to a street cabinet 108 or other like structure that provides utility power (e.g., "the power grid") in a wired way via the coupled streetlight fixture 102 and light pole 106. The utility power may provide 120 VAC, 240 VAC, 260 VAC, or some other power source voltage, which is used to power both the light source of the streetlight fixture 102 and the coupled smart sensor device 104. In addition, smart sensor devices 104A-104I may also be coupled to the same street cabinet 108 or another structure via a wired backhaul connection via the coupled streetlight fixture 102 and light pole 106. It is understood that these wired connections are in some cases separate wired connections (e.g., copper wire, fiber optic cable, industrial Ethernet cable, or the like) and in some cases combined wired connections (e.g., power over Ethernet (PoE), powerline communications, or the like). For simplification of the system level deployment 100 of FIG. 1, the wired backhaul and power line 106 is illustrated as a single line. The street cabinet 108 is coupled to the power grid, which is administered by a licensed power utility agency, and the street cabinet 108 is coupled to the public switched telephone network (PSTN).

As mentioned above, a smart sensor device 104 may operate as a small cell networking device. A user 114 holding a mobile device 116 is represented in the system level deployment 100 of FIG. 1. A vehicle having an in-vehicle mobile device 118 is also represented. The vehicle may be an emergency service vehicle, a passenger vehicle, a commercial vehicle, a public transportation vehicle, a drone, or some other type of vehicle. The user 114 may use their mobile device 116 to establish a wireless communication session over a cellular-based network controlled by an MNO, wherein packetized wireless data is passed through the smart sensor device 104 to the MNO via cellular macrocell tower. Concurrently, the in-vehicle mobile device 118 may also establish a wireless communication session over the same or a different cellular-based network controlled by the same or a different MNO, wherein packetized wireless data of the second session is also passed through the smart sensor device 104 to the MNO via cellular macrocell tower.

The sun and moon 122 are shown in FIG. 1. Light or the absence of light based on time of day, weather, geography, or other causes provide information (e.g., ambient light) to the light sensors of the smart sensor device 104. Based on this information, the smart sensor device 104 provides control instructions or signals to the associated streetlight fixture, which controls its corresponding light source.

Although FIG. 1 illustrates smart sensor devices 104A-104I, more or fewer smart sensor devices may be employed in embodiments described herein. For example, a smart sensor device 104 can be installed on every streetlight fixture 102 on a street or in a neighborhood, city, county, or other geographical boundary. As a result, embodiments described herein may be employed for one smart sensor device, five smart sensor devices, 100 smart sensor devices, 10,000 smart sensor devices, or some other number of smart sensor devices. Moreover, smart sensor devices 104 may be installed on each streetlight fixture 102 in a geographical boundary or they may be installed on every other or every third streetlight fixture 102. Thus, the distribution of smart sensor devices 104 throughout a street, neighborhood, or city can take on virtually any distribution and may differ from one street, neighborhood, or city to the next.

Figure 2:
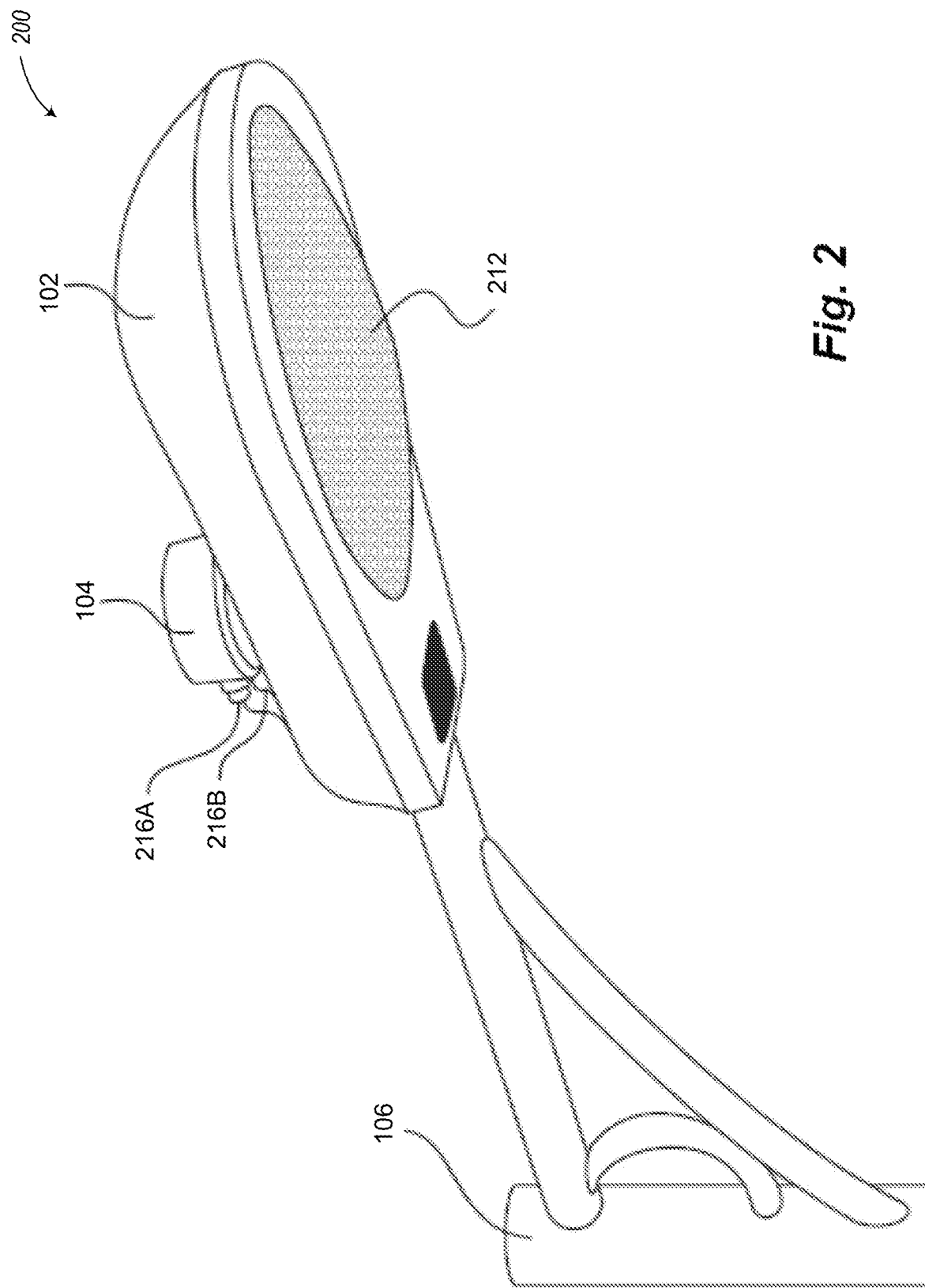
FIG. 2 is streetlight that includes a smart sensor device that is coupled to a streetlight fixture, which itself is coupled to a light pole.

FIG. 2 is streetlight 200 that includes a smart sensor device 104 that is coupled to a streetlight fixture 102, which itself is coupled to a light pole 106. The streetlight fixture 102 includes a light source 212. The light source 212 may be an incandescent light source, a light emitting diode (LED) light source, a high pressure sodium lamp, or any other type of light source. In the street light 200 of FIG. 2, the smart sensor device 104 is coupled to the streetlight fixture 102 via a multi-pin NEMA connector. That is, the pins of the multi-ping NEMA connector are electromechanically coupled to a compatible NEMA socket integrated into the light fixture 102. In some cases, the smart sensor device 104 replaces or otherwise takes the place of a different light sensor device, which does not have the features provided by the smart sensor device 104. In this illustration, cables 116A, 116B are coupled to the smart sensor device 104 to provide additional functionality to the smart sensor device 104. For example, the cables 116A, 116B may be arranged to couple to the smart sensor device 104 to other devices or sensors (not illustrated) (e.g., cameras, transducers, weather devices, internet of things (IoT) devices, or any other type of device). Accordingly, the cables 116A, 116B are arranged to pass sensor signals, internet of things (IoT) signals, multimedia signals (e.g., cameras or other multimedia devices), weather signals, transducer signals, control signals, or any other type of power and/or signaling data to the smart sensor device 104.

Figure 3:
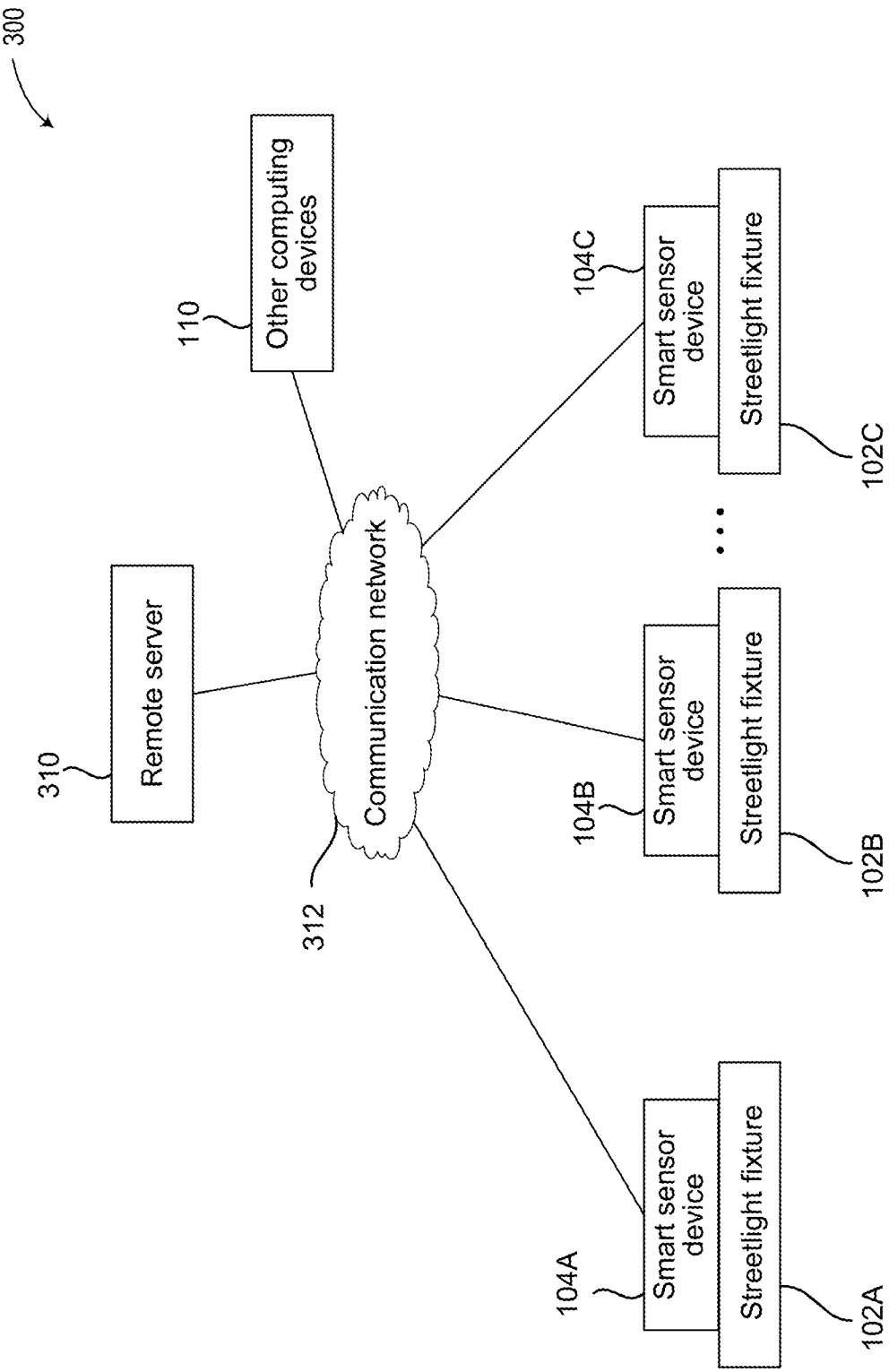
FIG. 3 is a block diagram of a communication environment between smart sensor devices and a remote server.

FIG. 3 is a block diagram of a communication environment 300 between smart sensor devices 104A-104C and a remote server 310. As described herein, smart sensor devices 104A-104C are coupled to streetlight fixtures 102A-102C, respectively. Each smart sensor device 104A-104C communicates with each other, with other computing devices 110, or remote server 310 via a communication network 312. The communication network 213 includes one or more wired or wireless networks that are configured to communicatively couple various computing devices to transmit content/data from one or more devices to one or more other devices. For example, communication network 312 may include, but is not limited to, Ethernet, Power over Ethernet, powerline communications (PLC), the Internet, cellular networks, short-range wireless networks, X.25 networks, a series of smaller private connected networks that carry the information, or some combination thereof.

As described herein, smart sensor devices 104A-104C monitor one or more sensors or conditions associated with the corresponding streetlight fixture 102A-102C for events. In various embodiments, the remote server 310 may send a selection of such events to each smart sensor device 104A-104C. In some embodiments, the selection of events to monitor may be the same for a plurality of smart sensor devices 104A-104C. In other embodiments, one or more smart sensor devices may be provided a different selection of events from one or more other smart sensor devices.

In response to an occurrence of an event, the respective smart sensor device 104 stores information or data associated with the event in its local, non-volatile memory. In some embodiments, this local memory may be a ring buffer that operates in a first-in-first-out incident buffer. In some embodiments, the local memory may be limited in size (e.g., arranged to store 1024 bytes (1 KB) or less, 65536 bytes (64 KB) or less, 262144 bytes (256 KB) or less, or some other limited amount of memory. In these cases, or in alternative cases, the local memory may be dedicated only to the storage of sensor-based data, which may or may not include storage of functions or data (e.g., pointer, compare functions, and the like) that support storing and retrieving the sensor-based data. The stored event data is correlated to a distributed clock that is common to each smart sensor device 104A-104C, as discussed herein.

When the local memory is full, the smart sensor device can overwrite the oldest stored data in the memory to make space for new data to store. The memory may be determined to be full when a selected amount of storage capacity is unitized for event data or when data is older than a selected timeframe (e.g., data is stale and can be delete or overwritten after 5 seconds). In this way, the local, non-volatile memory of the smart sensor device 104 stores some amount of data that can be recovered in response to an incident or failure. For example, in some embodiments, each smart sensor devices 104A-104I can transmit the current contents of its local incident buffer to the remote server 310 upon boot-up.

In other embodiments, the remote server 310 may send a request to each smart sensor device 104A-104I (or a subset thereof) to respond with the current contents of its local incident buffer. In yet other embodiments, the smart sensor devices 104A-104C send the stored event data to the remote sever 310 at selected time intervals, in response to selected event occurrences, when a selected amount of data has been saved, or some other time period.

The remote server 310 takes the received correlated event data from one or a plurality of the smart sensor devices 104A-104C to generate an aggregated last known state of the plurality of smart sensor devices 104A-104C. In this way, the system, a user, or an administrator can analyze the last known state data to determine if a failure occurred, how a failure occurred, what needs to be repaired or fixed in response to the failure, etc.

Non-limiting and exemplary operation of certain aspects of the disclosure will now be described with respect to FIGS. 4-5. In at least one of various embodiments, process 400 described in conjunction with FIG. 4 may be implemented by or executed on one or more computing devices, such as smart sensor device 104 in FIG. 1 or other streetlight fixture monitoring device. And in at least one of various embodiments, process 500 described in conjunction with FIG. 5 may be implemented by or executed on one or more computing devices, such as remote server computer 310 in FIG. 3 or smart sensor device 104 in FIG. 1.

Figure 4:
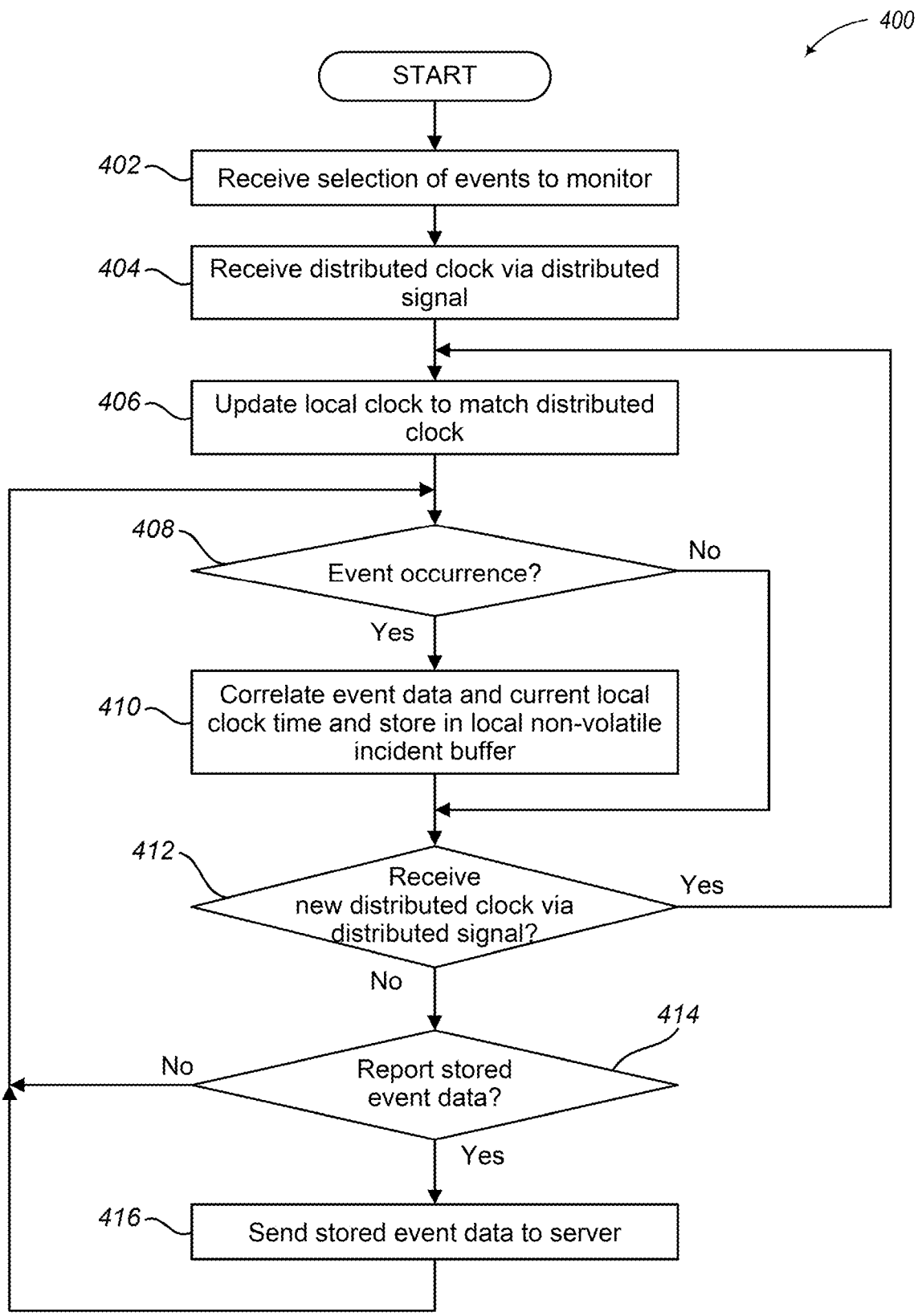
FIG. 4 is a logical flow diagram generally showing one embodiment of a process for monitoring events associated with a streetlight fixture.

FIG. 4 is a logical flow diagram generally showing one embodiment of a process 400 for monitoring events associated with a streetlight fixture 102.

Process 400 begins after a start block. At block 402 a selection of events to monitor is received. The selection of events identifies one or more sensors in which the smart sensor device 104 is perform real-time data monitoring to capture or obtain event data, one or more conditions or thresholds that are to be satisfied before the smart sensor device 104 captures event data, or some combination thereof. For example, the selection of events can indicate that the smart sensor device 104 is to capture and store an accelerometer reading every one-half second. As another example, the selection of events can indicate that the smart sensor device 104 is to capture accelerometer readings every one-half second but only store the data if the accelerometer reading value was above a selected threshold. In yet another example, the selection of events can indicate that in response to a temperature reading value being above a threshold value, capture and store a current power usage value. Accordingly, the selection of events identifies what sensors to monitor, how to monitor sensors, when to monitor sensors, or a combination thereof.

Process 400 proceeds to block 404, where a distributed clock is received via a distributed signal. The distributed clock is one that is common to a plurality of smart sensor devices 104A-104I. The distributed clock may be simultaneously provided from a single source to a plurality of smart sensor devices, or the distributed clock may be individually provided to each separate smart sensor device.

For example, GPS signals include a highly accurate clock signal that is used to triangulate a location of the device that receives the GPS signals. Accordingly, a plurality of smart sensor device 104 can receive a GPS signal and use its clock as the distributed clock. In another example, another computing device or system may provide the distributed clock to each smart sensor device 104. For example, each smart sensor device 104 may separately receive the distributed clock from a cellular network or from another device via a separate communication network. In any case, the distributed clock is common to a plurality of smart sensor devices 104A-104I.

Process 400 continues at block 406, where a local clock of the smart sensor device is 104 is updated to match the distributed clock. In various embodiments, the smart sensor device 104 set or otherwise calibrates its local clock to be synchronized to the distributed clock. In this way, the local clock is identical to or matches the distributed clock.

Process 400 proceeds next to decision block 408, where a determination is made whether an event that is being monitored has occurred. In various embodiments, this determination is made based on the data captured from the one or more sensors or conditions being monitored. In other embodiments, this determination is made based on a comparison between monitored sensor data and one or more thresholds identified in the selection of events received at block 402. If an event has occurred, process 400 flows to block 410; otherwise, process 400 flows to decision block 412.

At block 410, event data and the current local clock time are correlated and stored in the local, non-volatile memory of the smart sensor device 104. In various embodiments, the event data is stored in a first-in-first out configured incident buffer. In this way, only the most recent event data is stored. The size of the incident buffer may be a selected amount of data, a selected amount of time, or based on some other criteria.

The correlation between the event data and the current local clock time may include storing the event data with corresponding metadata that identifies the current local clock time. In other embodiments, a table or other data structure may be utilized to store the event data, the current local clock time, and the correlation between the two.

Process 400 proceeds to decision block 412, where a determination is made whether a new distributed clock has been received by the smart sensor device 104 via the distributed signal. In some embodiments, the smart sensor device 104 receives a new distributed clock at selected time intervals, such as a new GPS signal. In other embodiments, the smart sensor device 104 requests a new distributed clock signal from the remote server 310 or some other device or network. If a new distributed clock is received, process 400 flows to decision block 414; otherwise, process 400 loops to block 406 to update the local clock with the newly received distributed clock.

At decision block 414, a determination is made whether the stored event data is to be reported. In some embodiments, the smart sensor device 104 transmits or otherwise provides the stored event data to the remote server 310 at selected times, at selected time intervals, when the incident buffer is full, or based on some other condition or timing criteria.

In yet other embodiments, the smart sensor device 104 may report the stored event data in response to a monitored event or an external incident. For example, if a tilt angle of the smart sensor device 104 exceeds some threshold, then the smart sensor device 104 may transmit the tilt angle data (or all the event data) from its incident buffer to the remove server 310. In another example, if the remote server 310 detects an external incident or otherwise wants to obtain a current status of the plurality of smart sensor devices, then the remote server 310 may request the event data from the smart sensor device 104. If the stored event data is to be reported, then process 400 flows to block 416; otherwise, process 400 loops to decision block 408 to continue to monitor for event occurrences.

At block 416, the smart sensor device 104 sends the stored event data to the remote server 310. In various embodiments, the stored event data that is provided to the remote server 310 includes both the recorded event data and the correlated local clock time (i.e., the synchronized distributed clock time).

After block 416, process 400 loops to decision block 408 to continue to monitor for event occurrences.

Figure 5:
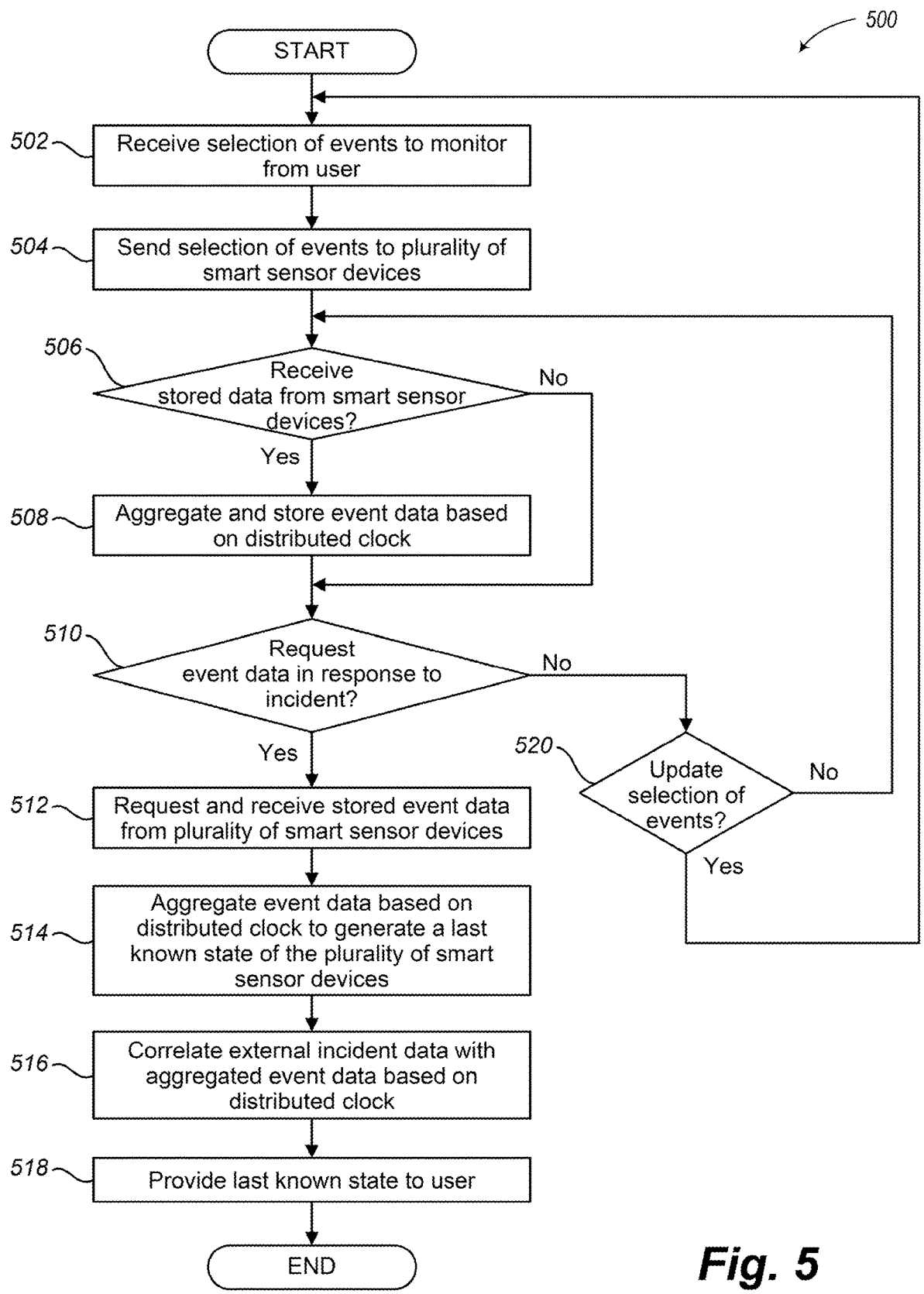
FIG. 5 is a logical flow diagram generally showing one embodiment of a process for generating a last known state across a plurality of dispersed smart sensor devices.

FIG. 5 is a logical flow diagram generally showing one embodiment of a process 400 for correlating a last known state across a plurality of dispersed smart sensor devices 104A-104I.

Process 500 begins after a start block. At block 502, a selection of events to monitor is received from a user. In various embodiments, the remote server 310 provides a graphical user interface to one or more users or administrators that can select when events the smart sensor devices 104A-104I are to monitor. The user can select events for individual smart sensor devices 104 or for a plurality of smart sensor devices 104A-104I. Thus, a plurality of smart sensor devices 104A-104I may have the same selection of events or different selections of events, or some combination thereof.

Process 500 proceeds to block 504, where the selection of events is sent to each plurality of smart sensor devices 104A-104I. The selection of events may be provided via one or more communication networks 312.

Process 500 continues to decision block 506, where a determination is made whether event data stored by one or more smart sensor devices 104 is received. As discussed above, some smart sensor devices 104 may periodically send event data to the remote server 310. If event data is received, process 500 flows to block 508; otherwise, process 500 flows to decision block 510.

At block 508, the received event data is aggregated and stored based on a distributed clock associated with the event data. As discussed above, the event data is correlated with a local clock of the smart sensor device that captured the event data, where that local clock is synchronized to a distributed clock. As a result, correlated event data from a plurality of smart sensor devices 104A-104I can be aggregated based on the distributed clock.

After block 508, or if, a decision block 506, no event data is received, process 500 flows to decision block 510. At decision block 510, a determination is made whether the remote server 310 is to request event data stored by the plurality of dispersed smart sensor devices 104A-104I. In various embodiments, this request is in response to an incident. Examples of such incidents may include, but are not limited to, power failures, smart sensor device failures, streetlight fixture failures, environmental conditions (e.g., hurricane, tornado, flood, earthquake, volcano, monsoon, cyclone, blizzard, hailstorm, etc.), event data from one or more smart sensor devices 104, etc. In some embodiments, an incident may also be an input request from a user or administrator to receive a current state of the plurality of smart sensor devices 104A-104I. If the event data is to be retrieved, process 500 flows to block 512; otherwise, process 500 flows to decision block 518.

At block 512, a request for the stored event data is sent to each of the plurality of smart sensor devices and the stored event data is received from the plurality of smart sensor devices. In various embodiments, the request and the event data are transmitted via one or more wired or wireless networks, such as communication network 312 in FIG. 3. In other embodiments, a technician manually obtains the event data from one or more of the smart sensor devices 104A-104I, such as via a USB port or other direct data-transfer link. Once obtained, the technician can upload the event data to the remote server 310 via a USB port or some other wired or wireless communication network.

Process 500 proceeds next to block 514, where the event data is aggregated based on the distributed clock to generate a last known state of the plurality of smart sensor devices 104A-104I. As discussed herein, each stored event data is correlated with the distributed clock, via the local clock that is synchronized to the distributed clock. The last known state may be a single value, average, minimum value, maximum value, heat map, table of values, or other metrics that provide the general state of the plurality of geographically dispersed smart sensor devices.

Process 500 continues next at block 516, where external incident data is correlated with the aggregated event data based on the distributed clock. In some embodiments, additional external incident data may be obtained, such as weather information from municipal weather stations, seismic activity from buried seismic sensors, user provided incident information (e.g., car wreak location, power usage, etc.), or other information, or some combination thereof. In some embodiments, block 516 may be optional and may not be performed.

Process 500 proceeds to decision block 518, where the last know state is provided to a user or administrator. In various embodiments, a graphical user interface may be presented to the user, which includes the various metrics associated with the aggregated event data. In some embodiments, where external incident data is also correlated with the event data based on the distributed clock, then that additional correlation may be presented to the user.

After decision block 518, process 500 terminates or otherwise returns to a calling process to perform other actions. Although not illustrated, process may, in other embodiments, loop to decision block 506 to continue to wait for additional data from the smart sensor devices or occurrence of a distributed failure.

If, at decision block 510, a distributed failure has not occurred and the event data is not retrieved, process 500 flows from decision block 510 to decision block 520. At decision block 520, a determination is made whether the selection of events is updated. In some embodiments, the user may provide updates or changes to the selection of events for one or more of the plurality of smart sensor devices 104A-104I. If the selection of events is to be updated, process 500 loops to block 502 to receive the updated selection of events from the user; otherwise, process 500 loops to decision block 506 to continue to wait for event data or an incident and retrieval of the event data in response to such incident.

Figure 6:
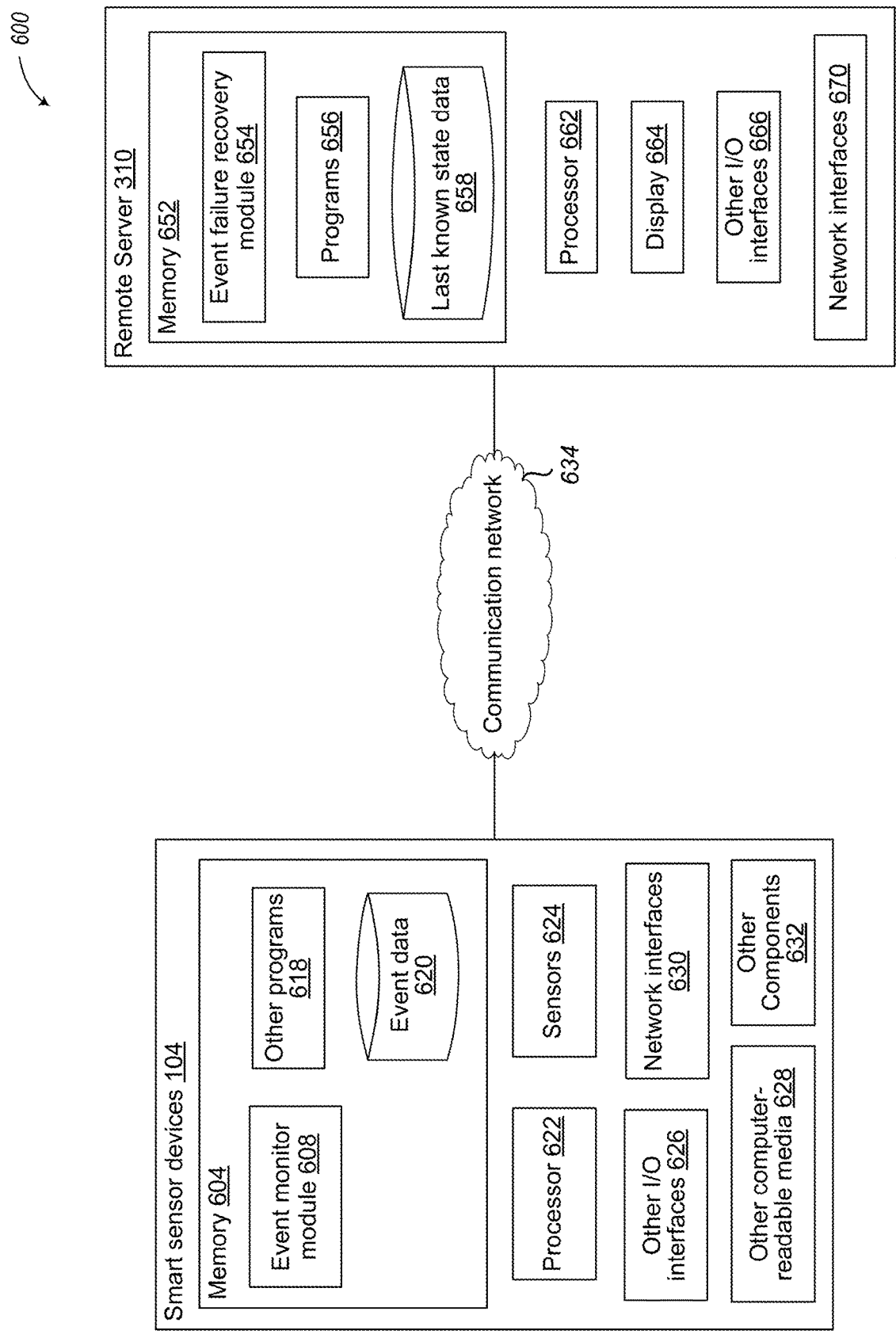
FIG. 6 shows a system diagram that describes one implementation of computing systems for implementing embodiments described herein.

FIG. 6 shows a system diagram that describes one implementation of computing systems for implementing embodiments described herein. System 600 includes smart sensor devices 104 and remote server 310.

As described herein, smart sensor devices 104 are computing devices that can perform functionality described herein for monitoring and storing event data and correlating such event data based on a distributed clock to create a synchronized last known state among a plurality of smart sensor devices 104. One or more special-purpose computing systems may be used to implement a smart sensor device 104. Accordingly, various embodiments described herein may be implemented in software, hardware, firmware, or in some combination thereof. Each smart sensor device 104 includes memory 604, one or more processors 622, sensors

624, input/output (I/O) interfaces 626, other computer-readable media 628, network interface 630, and other components 632.

Processor 622 includes one or more processing devices that execute computer instructions to perform actions, including at least some embodiments described herein, such as process 400 in FIG. 4. In various embodiments, the processor 622 may include one or more central processing units (CPUs), programmable logic, or other processing circuitry.

Memory 604 may include one or more various types of non-volatile and/or volatile storage technologies. Examples of memory 604 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 604 may be utilized to store information, including computer-readable instructions that are utilized by processor 622 to perform actions, including at least some embodiments described herein.

Memory 604 may have stored thereon various modules, such as event monitor module 608. The event monitor module 608 provides functionality to monitor sensors or conditions of the smart sensor device 104 to detect event occurrences, store the event data correlated with a distributed clock, and provide the correlated data to the remote server 310, as described herein.

Memory 604 stores event data 620, which may be a ring buffer that stores a selected amount of event data in local, non-volatile memory. The event data 620 is stored such that the event data has a capture or occurrence time that is synchronized or otherwise correlated with a distributed clock that is provided to a plurality of smart sensor devices 104. The memory 604 may also store other programs 618, which may include operating systems, user applications, or other computer programs.

Sensors 624 include one or more sensors in which the smart sensor device 104 can monitor for events. Examples of sensors 624 include, but are not limited to, tilt sensors, accelerometers, temperature sensors, power metering sensors, cameras, microphones, humidity sensors, rain collection sensors, wind sensors, or other sensors that can provide information about the smart sensor device itself, the streetlight fixture 102 in which the smart sensor device is couple, the light pole that the corresponding streetlight fixture 102 is coupled, or the environment surrounding the smart sensor device 104 and the corresponding streetlight fixture 102 and light pole 106. The sensors 624 may be included, incorporated, or embedded into the smart sensor device 104, as illustrated, or one or more of the sensors 624 may be distinct and separate from the smart sensor device 104.

I/O interfaces 626 may include interfaces for various other input or output devices, such as audio interfaces, other video interfaces, USB interfaces, physical buttons, keyboards, or the like. In some embodiments, the I/O interfaces 626 provide functionality for the smart sensor device 104 to communicate with the sensors 624.

Other computer-readable media 628 may include other types of stationary or removable computer-readable media, such as removable flash drives, external hard drives, or the like.

Network interfaces 630 are configured to communicate with other computing devices, such as the remote server 310, via a communication network 634. Network interfaces 630 include transmitters and receivers (not illustrated) to send and receive data as described herein. The communication network 634 may include the communication network 312 of FIG. 3.

Other components 632 may include circuits, modules, software instruction-based devices (e.g., state machines, programmable logic, and the like), and other logic to implement particular structures of the smart sensor device 104. The other components 632 may be integrated or discreet components.

In some cases, the other components 632 include memory control logic such as pointer controls for ring buffers, direct memory access (DMA) controllers, and the like.

In some cases, the other components 632 include power supply circuits. The power supply circuits may include power saving devices, which may be based on local clock circuits.

In some cases, the other components 632 include local clock circuits, which are arranged to supply a local clock signal to circuitry of the smart sensor device 104. The local clock circuits in the other components 632 module may be crystal-based, oscillator-based, line- or other-frequency based, or the local clock circuitry may be based on some other source. In some cases, the local clock circuitry is arranged with synchronization circuity to calibrate, coordinate, compare, or otherwise provide cooperation between a local clock signal and a distributed clock signal.

A global positioning system (GPS) receiver may be included in the other components 632. In addition to providing location information, the GPS device will also produce the distributed clock signal described in the present disclosure. The distributed clock signal of the particular smart sensor device 104 corresponds to a same distributed clock signal in each of smart sensor device 104 of the plurality of smart sensor devices 104A-104I. Because each smart sensor device 104 sets or otherwise calibrates its local clock signal from its own version of the GPS signal-based distributed clock, each local clock of each smart sensor device 104A-104I is synchronized to a same distributed clock. In this way, when each smart sensor device 104A-104I generates sensor data and time-stamps the sensor data, a later analysis of sensor data from a plurality of smart sensor devices 104A-104I will provide useful, time-synchronized data collected over a geographic area defined by the location of each smart sensor device. In geographic area may, of course, be a small geographic area as defined by ten or fewer smart sensor devices 104 respectively coupled to ten or fewer light poles 106. Alternatively, the geographic area may be defined over a geographic area of any size, limited only by the number of smart sensor devices 104 respectively coupled to light poles 106 (e.g., dozens, hundreds, thousands, or more).

The other components 632 may include a processor-based event-monitoring circuit. The processor-based event-monitoring circuit, which may also operate synchronously with the local clock signal, is arranged to receive event data captured by one or more of the sensors 634. The processor-based event-monitoring circuit may also, in at least some cases, correlate event data with a distributed clock based on the synchronized local clock signal. In these and other cases, the processor-based event-monitoring circuit directs or otherwise controls the storing of correlated event data in the memory 604.

The remote server 310 is computing device that is remote from the smart sensor devices 104. The remote server 310 receives event data from a plurality of smart sensors 104 and synchronizes the event data based on the distributed clock so as to generate a current state or last known state of a plurality of smart sensor devices 104. One or more special-purpose computing systems may be used to implement the remote server 310. Accordingly, various embodiments described herein may be implemented in software, hardware, firmware, or in some combination thereof.

The remote server 310 includes memory 652, one or more processors 662, I/O interfaces 666, and network interface 670, which may be similar to or incorporate embodiments of memory 604, processor 622, I/O interfaces 626 and network interface 670 of smart sensor devices 104, respectively. Thus, processor 662 includes one or more processing devices that execute computer instructions to perform actions, including at least some embodiments described herein. In various embodiments, the processor 622 may include one or more central processing units (CPUs), programmable logic, or other processing circuitry. Memory 652 may include one or more various types of non-volatile and/or volatile storage technologies. Memory 652 may be utilized to store information, including computer-readable instructions that are utilized by processor 662 to perform actions, including at least some embodiments described herein, such as process 500 in FIG. 5. Memory 652 may also store programs 656 and last known state data 658. The last known state data 658 may include synchronized or correlated event data from a plurality of smart sensor devices 104. In some embodiments, the last known state data 658 may also be correlated with other failure data, such as weather conditions, external seismic sensor data, etc. The display 664 is a display device capable of rendering content, data, or information to a user. In various embodiments, the event failure recovery module 654 presents a user interface to a user via the display 524. Such a user interface may include event data from a plurality of smart sensor devices, setting in which the user can select which events the smart sensor devices are to monitor, etc. The display 664 may be a liquid crystal display, light emitting diode, or other type of display device, and may include a touch sensitive screen capable of receiving inputs from a user's hand, stylus, or other object.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., recording and reporting the collection of utility grade power metering data, recording and reporting IoT data, crowd control data, anomalous action data, and the like). An example of an activity that is not real-time is one that occurs over an extended period of time (e.g., hours or days)] or that occurs based on intervention or direction by a person or other activity.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As described herein, for simplicity, a user is in some case described in the context of the male gender. For example, the terms "his," "him," and the like may be used. It is understood that a user can be of any gender, and the terms "he," "his," and the like as used herein are to be interpreted broadly inclusive of all known gender definitions.

As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

U.S. Provisional Patent Application No. 62/614,918, filed Jan. 8, 2018 and U.S. Provisional Patent Application No. 62/730,379, filed Sep. 12, 2018, to which the present application claims priority, are hereby incorporated herein by reference in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a plurality of smart sensor devices coupled to respective streetlight fixtures of a plurality of streetlight fixtures, wherein each smart sensor device includes:
a GPS receiver arranged to receive GPS signals that include a distributed clock;
a transceiver arranged to transmit stored correlated event data;
a local clock circuit arranged to supply a local clock signal to circuitry of the smart sensor device, wherein the local clock signal is synchronized to the distributed clock;
a local memory arranged to store event data; and
a processor-based event-monitoring circuit arranged to receive event data captured by a sensor, correlate the event data with the distributed clock based on the synchronized local clock signal, and store the correlated event data in the local memory; and
a remote server that includes:
a memory arranged to store the correlated event data received from the plurality of smart sensor devices; and
a processor arranged to execute computer instructions stored in the memory, which when executed cause the processor to:
aggregate the correlated event data from the plurality of smart sensor devices based on the distributed clock; and
generate a current system state across the plurality of smart sensor devices from the aggregated event data and synchronized to the distributed clock.

2. The system of claim 1, wherein the current system state is a last known state before at least one of a power failure, a failure of at least one of the plurality of smart sensor devices, a failure of at least one of the plurality of streetlight fixture, and a determined environmental condition.

3. The system of claim 1, wherein the processor-based event-monitoring circuit of each of the plurality of smart sensor devices is further arranged to transmit the correlated event data to the remote server in response to an external incident.

4. The system of claim 1, wherein the processor of the remote server is arranged to execute additional computer instructions that, when executed, cause the processor to send a request to each of the plurality of smart sensor devices requesting each of the plurality of smart sensor devices to transmit the correlated event data currently stored in their local memory to the remote server.

5. The system of claim 4, wherein the request is sent to each of the plurality of smart sensors in response to an incident.

6. The system of claim 1, wherein the processor of the remote server is arranged to execute additional computer instructions that, when executed, cause the processor to send to each respective smart sensor device of the plurality of smart sensor devices a selection of events to be monitored by the respective smart sensor device.

7. The system of claim 1, wherein the processor-based event-monitoring circuit is further arranged to receive a selection of events to monitor for the event data.

8. The system of claim 1, wherein the local memory of each of the plurality of smart sensor devices is a non-transitory memory that temporarily stores the correlated event data in a first-in-first-out configuration.

9. The system of claim 1, wherein each of the plurality of smart sensor devices includes:
at least one interface that is coupled to at least one sensor that is selected from the group consisting of a tilt sensor, an accelerometer, a temperature sensor, a power metering sensor, a camera, a microphone, a humidity sensor, a rain collection sensor, and a wind sensor.

10. A smart sensor device attachable to a streetlight fixture, the smart sensor device comprising:
a GPS receiver arranged to receive GPS signals that include a distributed clock;
a local clock circuit arranged to supply a local clock signal to circuitry of the smart sensor device, wherein the local clock signal is synchronized to the distributed clock;
a local, non-volatile memory arranged to store sensor-based data;
a sensor arranged to capture event data;
a processor-based event-monitoring circuit arranged to receive the captured event data from the sensor, correlate the event data with the distributed clock based on the synchronized local clock signal, and store the correlated event data in the memory; and
a transceiver arranged to transmit the stored correlated event data to a remote server.

11. The smart sensor device of claim 10, wherein the local, nonvolatile memory stores the correlated event data in a first-in-first-out configuration.

12. The smart sensor device of claim 10, further comprising:
a receiver that receives, from the remote server, a selection of events to monitor via the sensor for the event data.

13. The smart sensor device of claim 10, wherein the local clock circuit is further arranged to resynchronize the local clock signal to the distributed clock in response to a difference between the local clock signal and a new distributed clock that is included in a GPS signal.

14. The smart sensor device of claim 10, wherein the transceiver is arranged to transmit the stored correlated event data to the remote server in response to an external incident.

15. The smart sensor device of claim 10, further comprising:
a connector for coupling the smart sensor device to a streetlight fixture.

16. The smart sensor device of claim 10, wherein the sensor is selected from the group consisting of a tilt sensor, an accelerometer, a temperature sensor, a power metering sensor, a camera, a microphone, a humidity sensor, a rain collection sensor, and a wind sensor.

17. A method comprising,
receiving a selection of events to monitor for each of a plurality of smart sensor devices coupled to respective streetlight fixtures of a plurality of streetlight fixtures;
providing the selection of events to the plurality of smart sensor devices;
identifying an occurrence of an incident associated with the plurality of streetlight fixtures;

receiving, from each of the plurality of smart sensor devices, event data that is correlated to a distributed clock received by GPS receivers of the plurality of smart sensor devices;

aggregating the correlated event data based on the distributed clock; and generating a current state of the plurality of smart sensor devices prior to the occurrence of the incident.

18. The method of claim 17, further comprising:

sending a request for the correlated event data in response to the occurrence of the incident; and receiving, from each of the plurality of smart sensor devices, the correlated event data in response to the request.

19. The method of claim 17, further comprising:

providing the last known state of the plurality of smart sensors to a user.

20. The method of claim 17, wherein the current system state is a last known state of the plurality of smart sensor devices prior to the occurrence of the incident.

* * * * *